Nov. 26, 1968   G. H. CARDIFF   3,412,454
METHOD OF MANUFACTURING ADJUSTABLE SEGMENTED CONDUIT TURNS
Filed June 27, 1966   2 Sheets-Sheet 1

INVENTOR.
George H. Cardiff
BY John H. Widdowson
Phillip A. Rein
Attorneys

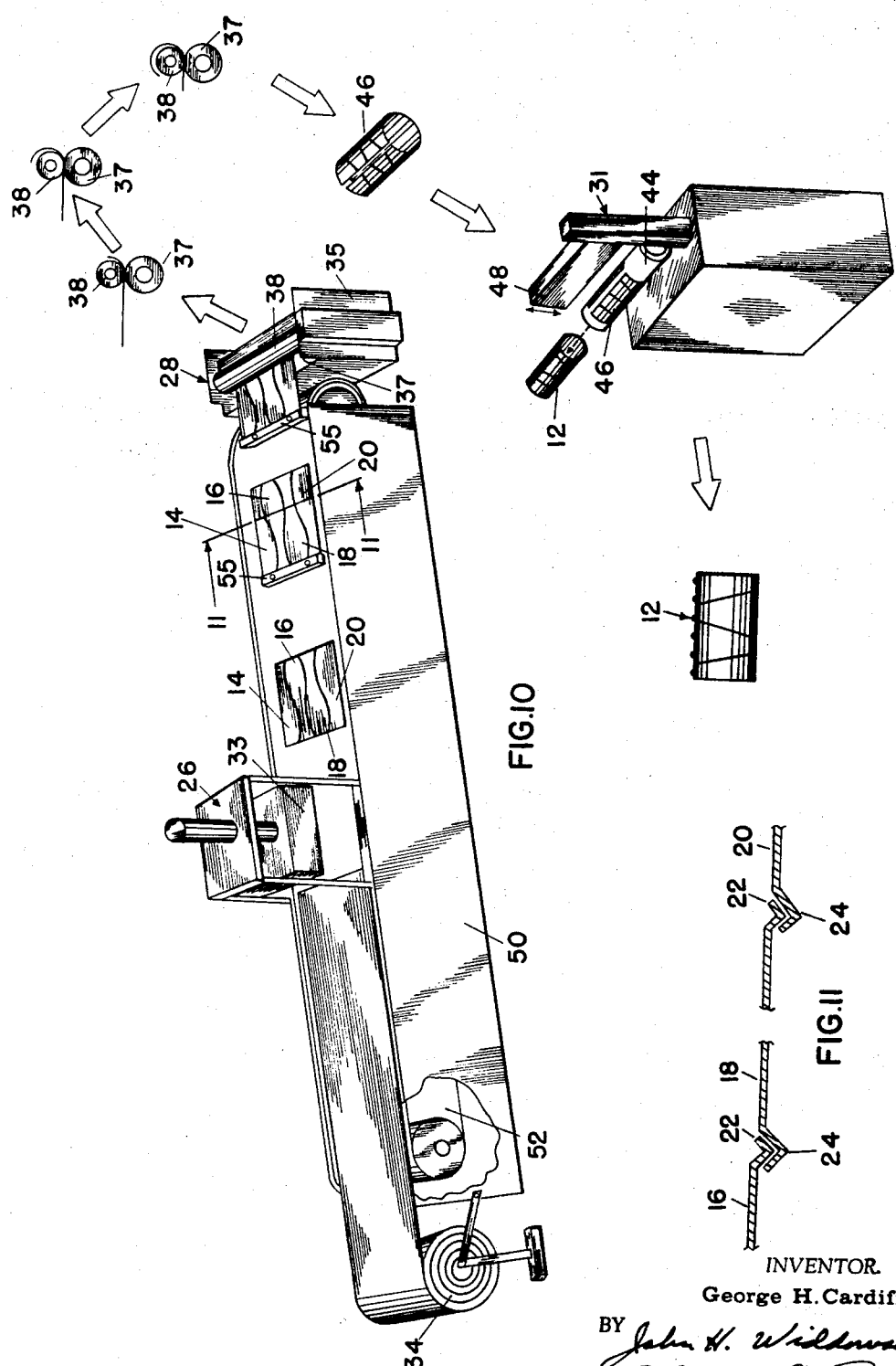

United States Patent Office 3,412,454
Patented Nov. 26, 1968

3,412,454
METHOD OF MANUFACTURING ADJUSTABLE SEGMENTED CONDUIT TURNS
George H. Cardiff, 725 E. 37th St. N., Wichita, Kans. 67219
Filed June 27, 1966, Ser. No. 560,765
6 Claims. (Cl. 29—437)

This invention relates to conduit turns, and more particularly, to a new and novel method of manufacturing segmented conduit turns. Still more specifically, this invention relates to a method of automatically producing adjustable segmented conduit turns from sheet stock material.

Various types of segmented conduit turns are known to the prior art manufactured by the use of extensive jigs and fixtures. The prior art methods of producing conduit turns have been rather slow and costly as it is difficult to produce a cylindrical shaped conduit turn from a plurality of contoured segments having overlapping edges by any type of mass production method while still maintaining the shape of the turned edges thereof for assembly in interlocking engagement. It is seen that the necessity for contoured interlocking edges for adjustability purposes does not lend itself to high speed production while permitting accurate assembly of the segments. Therefore, the prior art methods of manufacturing segmented conduit turns normally consists of forming the segments into a cylindrical contoured shape and, then, riveting together adjacent ends of the segments by hand methods as the rolling of the interlocking contoured segments cannot be accomplished on the conventional rolling type machines of the present day.

According with the present invention, a new process for manufacturing conduit turns has been provided which results in a quality product achieved in conjunction with high production rates. The new and novel method of this invention operates to successively (1) convey a continuous supply of sheet metal to a punch press mechanism, (2) punch a plurality of segments into a predetermined size and shape, (3) overlay the contoured segments, (4) form the overlayed contoured segments into a cylindrical shape by a rolling machine, and (5) fasten the adjacent opposite ends of the overlayed contoured segments to form an adjustable conduit turn as an end product of this invention.

In preferred specific embodiments of this invention, a method is provided for manufacturing segmented conduit turns. The actual structure of adjustable conduit turns is well known to the prior art and consists of a plurality of similar segments or elements of cylindrical shape having contoured outer edges making the segments of progressively variable width. The adjacent edges of the segments are formed with beads or stepped portions interfitting in nesting relationship to permit relative rotation of one segment relative to the other. The rotation of the segments relative to each other results in a shaping of the conduit turn to form, for example, a 90° or right angle turn while maintaining a substantially rigid structure without leakage of gas fumes or the like conveyed therethrough. In a preferred specific method of manufacturing a conduit turn of this invention, the preferred steps are as follows: (1) conveying in a supply of sheet metal material into a punch press machine; (2) punching and separating a plurality of contoured segments having progressively variable widths and turned longitudinal edges; (3) overlaying one turned edge of each segment into nesting engagement with the adjacent turned edge of another segment; (4) releasably securing one end of the overlayed segments by clamp means; (5) feeding the other end of the overlayed segments into a rolling machine; (6) removing the clamp means after entrance of the overlayed segments into the rolling machine; (7) forming the overlay segments into a cylindrical shape with the rolling machine without marring or misshaping the turned edges; (8) removing the cylindrical segments from the rolling machine; and (9) securing the adjacent opposite ends of each segment to form an adjustable segmented conduit turn. The final product is a rigid, high quality, precision product produced with a minimum of time and effort by a mechanized process overcoming the manufacturing disadvantages of the prior art thereby resulting in low cost and high production.

Accordingly, it is an object of this invention to provide a new manufacturing method for producing segmented conduit turns.

One object of this invention is to provide a new and novel manufacturing method for producing conduit turns overcoming the disadvantages of the above-mentioned prior art methods.

Another object of this invention is to provide a new manufacturing method wherein segmented conduit turns are produced with a minimum of time and effort resulting in high production rates.

Still another object of this invention is to provide a new manufacturing method for producing conduit turns from a plurality of contoured segments having interlocking turned edges utilizing a rolling machine operable to form the segments into a cylindrical shape without marring or damaging the turned edges.

One other object of this invention is to provide a new manufacturing method for producing segmented conduit turns utilizing a non-compressible, deflectable roller member to shape contoured segments into a cylindrical shape resulting in high quality and fast production.

Still, one other object of this invention is to provide a new manufacturing method for producing segmented, adjustable conduit turns utilizing the steps of stamping and separating sheet metal material into a plurality of contoured segments, forming the contoured segments into a cylindrical shape, and securing opposite adjacent ends of each segment to form an adjustable conduit turn produced with a minimum of time, effort, and manufacturing expense.

One further object of this invention is to provide a new manufacturing method for producing conduit turns that is simple to follow, economical in practice, operable to achieve high production rates, and resulting in a high quality product.

Various other objects, advantages and features of this invention will become apparent to those skilled in the art from the following discussion, taken in conjunction with the accompanying drawings, in which:

FIG. 10 is a perspective schematic diagram illustrating the individual steps of the new and novel method of this invention used to produce the end product of a segmented, adjustable conduit turn; and FIG. 11 is an enlarged fragmentary sectional view taken along line 11—11 in FIG. 10.

Figure 1:
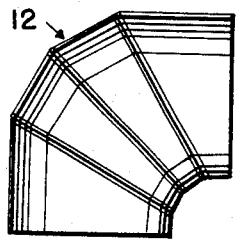
FIG. 1 is an elevational view of a conduit turn produced by the new and novel method of this invention illustrated as shaped in a 90 degree position.

The following is a discussion and description of preferred specific embodiments of the new method of manufacturing conduit turns of this invention, such being made with reference to the drawings, whereupon the same reference numerals are used to indicate the same or similar parts and/or structure. It is to be understood that such discussion and description is not to unduly limit the scope of the invention.

Referring now to the drawings in detail and particularly to FIG. 1, a conduit turn, indicated generally at 12, is constructed by the new and novel manufacturing method of this invention. The conduit turn 12 is adjustable, as will become obvious, from the elongated linear structure shown in FIG. 2 to the 90 degree turn of FIG. 1 or to an infinite number of angular variations therebetween.

Figure 3:
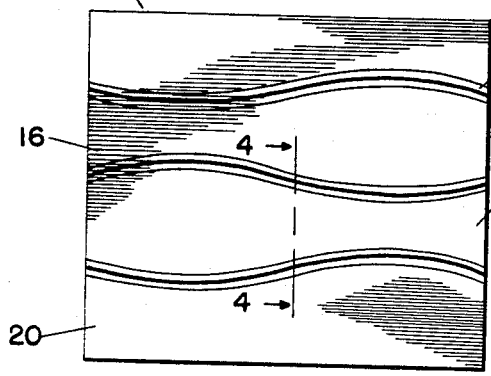
FIG. 3 is a top plan view of a sheet material punched and separated into contoured segments by one step of the method of this invention.
Figure 4:
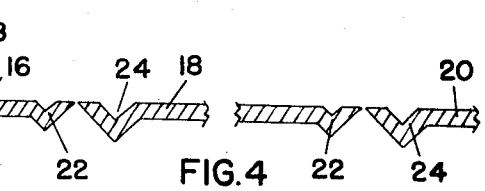
FIG. 4 is an enlarged fragmentary sectional view taken along lines 4—4 in FIG. 3.

As shown in FIG. 3, the conduit turn 12 is constructed from a plurality of segments 14, 16, 18, and 20 formed preferably from a stock sheet material such as tin or aluminum. The outermost segments 14 and 20 have parallel linear edges, respectively, which may be formed with a special connector means (not shown) for attachment to other pipe members to complete a conduit piping system. The innermost longitudinal edges of the segments 14 and 20 are formed with stepped sections 22 and 24, respectively, of substantially V-shape in transverse cross section but of different sizes. It is seen that the innermost edges of the segments 14 and 20 are of a sine-wave type contour having opposite end walls of substantially the same width. The innermost segments 16 and 18 are substantially identical to each other having a fish-shaped contour, each having stepped sections 22 and 24 on the respective longitudinal edges.

Figure 2:
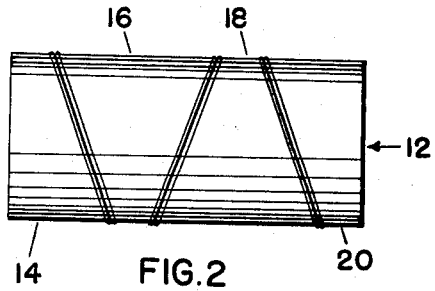
FIG. 2 is an elevational view similar to FIG. 1 illustrating the conduit turn having the segments rotated to form a linear conduit.

In the assembled condition of the conduit turn as shown in FIG. 2, the adjacent pairs of stepped sections 22 and 24 are overlayed to place the stepped sections 22 in nesting interfitting engagement with the other stepped sections 24. The overlayed segments are formed into a cylindrical shape with the opposite end portions of each overlapped and secured together as by welding, riveting, or the like. It is seen, therefore, that the conduit turn 12 is constructed of the interfitting segments 14, 16, 18 and 20 having the engaging stepped portions 22 and 24 permitting rotation of one segment relative to the other. Thus, this rotation places variable widths of the segments adjacent each other to achieve a variable angle or shape of the conduit turn 12. As for example, in FIG. 1, all the narrow portions of the segments 14, 16, 18, and 20 are placed adjacent each other to achieve the maximum angular turn, namely, a 90 degree conduit turn.

In the manufacturing process of the conduit turn 12 of this invention, a punch press machine 26 is used to form the segments 14, 16, 18, and 20; a special roller machine 28 is used to form the cylindrical shape of the overlayed segments 14, 16, 18, and 20; and a rivet machine 31 is used to secure the adjacent ends of each segment to form the final conduit turn 12. More specifically, the punch press machine 26 consists of a die member 33 operable in one pass to strike a portion of a roll 34 of sheet metal into a proper size; separate the same into the segments 14, 16, 18, and 20; and form the stepped portions 22 and 24 in the proper positions. The punch press machine 26 can be of any automatic or manual type using hydraulic pressure or the like to achieve the stamping operation.

As shown in FIGS. 5-7 and 10, the roller machine 28 has a cabinet 35 housing a power supply (not shown) operable to rotate a pair of forming rollers 37 and 38. The lower roller 37 has a central body or core 39 to which is connected an outer layer 41 of resilient material that is non-compressible but deflectable. Preferably, the outer layer 41 is made out of a polyurethane material manufactured by E. I. du Pont Nemours & Co. known as "Adiprene" (trademark). The other roller 38 is constructed of a rigid steel material and rotatable about its own axis with the outer surface thereof engageable with the layer 41 on the deflectable roller 37.

As the layer 41 is non-compressible, it is wrapped around the steel roller 38 under a continuous forming pressure to form a contour on the sheet metal therebetween which is regulated by both the size of the steel roller 38 and the amount of pressure between the urethane roller 37 and the steel roller 38. It is obvious that the roller machine 28 is regulated according to speed, pressure, etc. in a conventional manner with the unique roller 37 operable to achieve the new and novel manufacturing method of this invention as will become obvious.

The rivet machine 31 is illustrated in FIG. 10; however, it is obvious that a spot welding machine can also be used to secure the adjacent end walls of the segments 14, 16, 18 and 20. The rivet machine 31 has a mounting mandrel 44 adapted to receive the cylindrical shaped segments or tubular assembly 46 and a lever arm 48 movable vertically operable to rivet the overlapped end wall edges of the segments 14, 16, 18, and 20 in a conventional manner. The mandrel 44 is operable to properly size and shape the segments 14, 16, 18 and 20 prior to riveting to achieve the desired end product namely, the cylindrical conduit turn 12.

Figure 5:
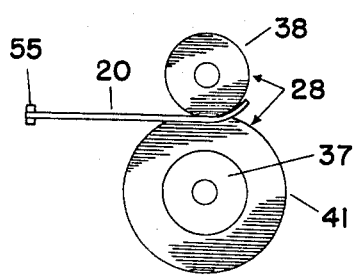
FIGS. 5, 6 and 7 are schematic diagrams illustrating the forming of the contour segments of this invention into a cylindrical shape by a novel rolling machine utilized in the method of this invention.
Figure 6:
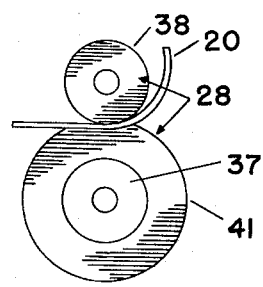
Figure 7:
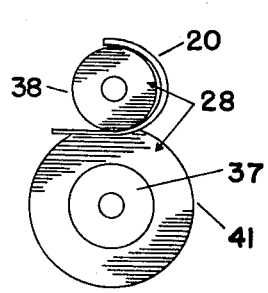

In the practice of the manufacturing method of this invention as shown in FIG. 10, the sheet metal roll 34 is rotatably mounted adjacent one end of a conveyor table 50 having an endless oscillatory belt 52 operable to move any material thereon from one end adjacent the roll 34 towards the opposite end. A portion of the sheet metal roll 34 is conveyed into the punch press machine 26 whereupon the segments 14, 16, 18 and 20 are punched into the predetermined sized shape. The segments are then overlayed to place the stepped portions 22 into nesting engagement with each adjaecnt stepped portion 24 whereupon the adjacent, rearward ends of the segments 14, 16, 18 and 20 are releasably secured as by a clamp member 55 to hold the same in the overlayed position. Subsequently, the other forward ends of the overlayed segments 14, 16, 18 and 20 are inserted between the rollers 37 and 38 of the roller machine 28. After initial rolling of the segments as shown in FIG. 5, the clamp member 55 is removed and the rotating rollers 37 and 38 operate as a punch to form the segments 14, 16, 18, and 20 into the desired cylindrical shape of the tubular assembly 46 without marring, distorting, or damaging in any way the stepped portions 22 and 24. The layer 41 deflects and conforms to the shape of the steel roller 38 but does not compress thereby assuring the production of a given cylindrical shape with high precision and consistent duplication.

The overlayed tubular assembly 46 is then transferred and mounted about the mandrel 44 of the rivet machine 31 whereupon the lever arm 48 is lowered and actuated to rivet the overlapped adjacent ends of each individual segment 14, 16, 18 and 20. The finished conduit turn 12 is thereupon removed from the mandrel 44 whereby the respective segments 14, 16, 18 and 20 can be rotated independently as desired to achieve the adjustable turn as shown in FIGS. 1 and 2 or any angular variation therebetween.

In summary, the manufacturing method of this invention for producing segmented conduit turns comprises the steps of: (1) conveying raw materials into a punch press machine; (2) stamping a plurality of contoured segments having stepped longitudinal edges; (3) overlaying adjacent ones of the longitudinal edges; (4) clamping together rearward adjacent ends of the overlayed segments with a clamp member; (5) feeding the forward end of the clamped segments into a rolling machine; (6) removing the clamp member; (7) forming the overlay segments into a cylindrical shape; (8) removing the cylindrical segments or tubular assembly from the rolling machine; (9) inserting the tubular assembly onto a sizing mandrel of a riveting machine; (10) overlapping adjacent ends of each segment of the tubular assembly; (11) securing the overlapped ends as by rivets; and (12) removing the completed conduit turn from the mandrel. It is seen that this method results in a high quality, rapid production of conduit turns with a minimum of manual labor thereby resulting in low production costs.

Figure 8:
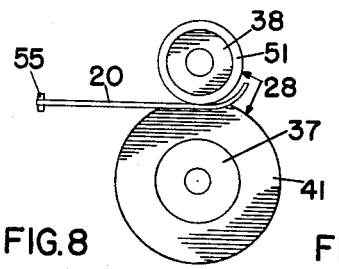
FIGS. 8 and 9 are additional embodiments of the rolling steps used in the method of this invention.

In another embodiment of the manufacturing method of this invention as illustrated in FIG. 8, the steel roller 38 of the roller machine 28 is formed with an outer layer 51 of resilient material such as rubber, urethane, or the like. The use of the layer 51 in cooperation with the outer layer 41 is operable to form the segments 14, 16, 18, and 20 into the tubular assembly 46 without deforming even severely stepped sections 22 and 24. The manufacturing method as previously described is substantially unchanged with the use of the layer 51 and merely assures production of a high quality conduit turn 12.

Figure 9:
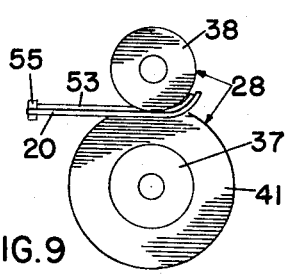

In still another embodiment of the manufacturing method of this invention (FIG. 9), after clamping together adjacent ends of the segments 14, 16, 18 and 20 with the clamp member 55 and prior to insertion into the roller machine 28, a resilient layer or pad 53 is overlayed to cover the entire upper surface of the segments. This assembly is inserated into the roller machine 28 and the pad 53 conforms to the configuration of the stepped sections 22 and 24 to prevent the marring and distortion thereof. The pad 53 is of a rubber or urethane material and protects severely stepped sections 22 and 24 similarly as the layer 51 on the roller 38.

As will be apparent in the foregoing description of the preferred embodiment of the applicant's new and novel manufacturing method of producing segmented conduit turns a relatively simple and inexpensive method has been provided which is operable to produce a high quality, precision conduit turn. Applicant's construction eliminates a great deal of time consuming and tedious hand work involved in the construction of cylindrical conduit turns therefore resulting in considerable monetary savings.

While the invention has been described in connection with preferred specific embodiments thereof, it will be understood that this description is intended to illustrate and not to limit the scope of the invention, which is defined by the following claims.

I claim:
1. A method of manufacturing a segmented conduit turn comprising the following steps:
   (a) conveying a sheet metal material into a punch press apparatus,
   (b) stamping the sheet metal with said punch press apparatus into a plurality of elongated contoured segments,
   (c) overlaying adjacent edges of said contoured segments into nesting engagement,
   (d) inserting said segments into a forming machine,
   (e) forming said segments into a cylindrical shape by said forming machine,
   (f) conveying said segments in the cylindrical shape to a joining fixture with adjacent opposite ends of said segments held in overlapping positions, and
   (g) securing said opposite ends of said segments by said joining fixture forming a segmented, conduit turn having each of said segments movable independently to a desired angular conduit turn.
2. A method as described in claim 1, wherein:
   (a) said conveying of the sheet metal from a continuous material roll on a conveyor belt table,
   (b) said stamping having a die member operable to form and separate said segments, each having stepped adjacent edge portions,
   (c) said overlapping of said edges positioning said adjacent stepped edge portions into nesting engagement, and
   (d) said forming operable to shape said segments into a cylindrical shape without deforming said stepped edge portions.
3. A method as described in claim 1 wherein:
   (a) said forming operation using roller members having one of said roller members formed of a resilient deflectable material and another one of said roller members of a rigid steel material cooperating to shape said segments into the cylindrical shape without deforming said adjacent edges.
4. A method as described in claim 3, wherein:
   (a) said one roller member having an outer covering of polyurethane resin material.
5. A method as described in claim 1, including:
   (a) after overlaying said segments, securing the other adjacent ends of said segments by a clamp member to hold the same in the nesting engagement, and
   (b) after inserting said segments into said forming machine, removing said clamp member thereby permitting formation into the cylindrical shape.
6. A method as described in claim 1, wherein:
   (a) said forming operation having one of said roller members of a rigid material and the other cooperating roller member of deflectable material whereby said segments are wrapped about said one roller member under continuous constant forming pressure.

References Cited
UNITED STATES PATENTS

| | | | |
|---|---|---|---|
| 743,050 | 11/1903 | Winfield | 113–116 |
| 2,737,707 | 3/1956 | Highet et al. | 29—149.5 |
| 3,111,922 | 11/1963 | Hock | 113—116 |
| 3,353,248 | 11/1967 | Harper | 29—505 X |

THOMAS H. EAGER, *Primary Examiner.*